Figure 1:
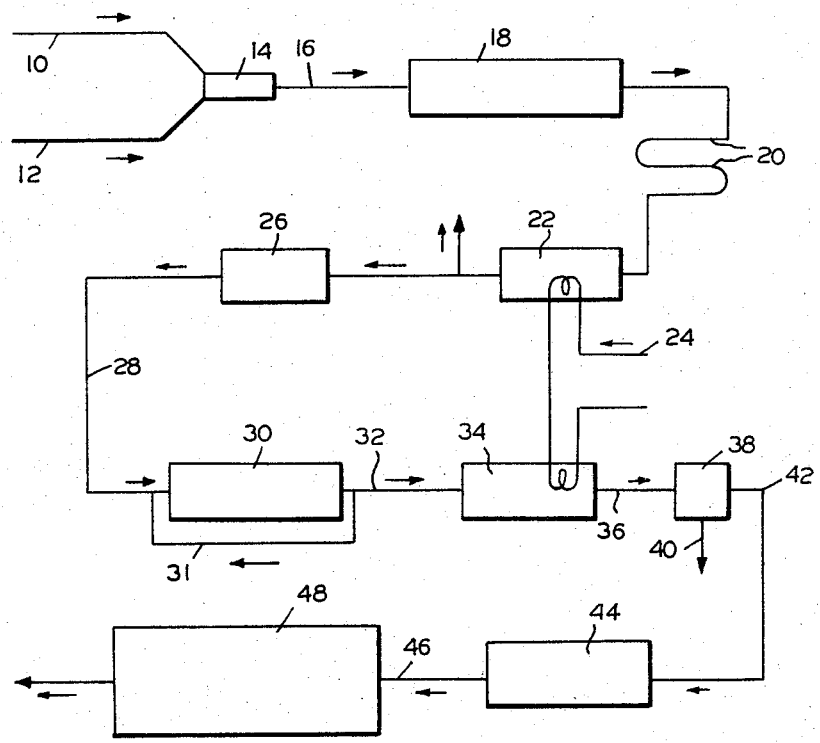

Nov. 21, 1967  J. H. HIRT  3,353,921
APPARATUS FOR PRODUCING INERT GAS
Filed Oct. 23, 1963

United States Patent Office 3,353,921
Patented Nov. 21, 1967

3,353,921
APPARATUS FOR PRODUCING INERT GAS
John H. Hirt, Monterey Park, Calif., assignor to Hirt Combustion Engineers, Montebello, Calif., a corporation of California
Filed Oct. 23, 1963, Ser. No. 318,439
1 Claim. (Cl. 23—281)

This invention generally relates to a method and apparatus for producing inert gases by the combustion of air and gaseous hydrocarbons. More particularly, this invention relates to a method for producing gases consisting essentially solely of $CO_2$ and $N_2$ by burning air and natural gas.

Inert gas atmospheres are in demand for a variety of purposes. For example, considerable quantities of inert gases are used in various metallurgical operations, in water purification systems, for poor preservation in warehouses, for filling spaces above combustible and potentially explosive liquids, etc. For use in these fields it is essential that the inert gas mixture be essentially free from oxygen, carbon monoxide, hydrogen and water vapor. It is highly desirable to have the $CO_2$ content as close as possible to that which is theoretically possible by stoichiometric considerations, regardless of the variations in the total volume output of the inert gas generator. Finally, the maximum output of the inert gas generator should be as high as possible in accordance with its size and portability.

There are a number of commercially available inert gas generators but each seems to suffer from one or more disadvantages. For example, most commercially available inert gas generators cannot produce more than about 9–10.5% $CO_2$. This is lower than the amount of $CO_2$ theoretically available. Other commercial units need either catalysts or inert refractory filling material, but catalysts lose their activity with time and must either be revived or replaced while inert refractory material is subject to breakage, partial blockage and the formation of localized areas of extremely high temperature. Other commercial units produce excessive amounts of oxygen, carbon monoxide or oxides of nitrogen. Still other inert gas generators encounter considerable maintenance problems due to the use of various water cooling arrangements for the high temperature gases.

It is therefore a primary object of this invention to provide an apparatus and process for reacting atmospheric air with a gaseous hydrocarbon such as natural gas in order to form an inert gas containing an amount of carbon dioxide which is close to that which is theoretically possible to obtain.

Another object of this invention is to provide an apparatus and process for producing an inert gas having little or no oxygen, carbon monoxide or hydrogen.

A further object of the invention is to provide an inert gas generator which does not require either a catalyst or an inert refractory filling in the combustion chamber.

An additional object of the invention is to provide an inert gas generator which is economical to construct, sturdy in construction, reliable in operation and relatively free of maintenance problems that are often associated with cooling very hot surfaces with water.

Figure 2:
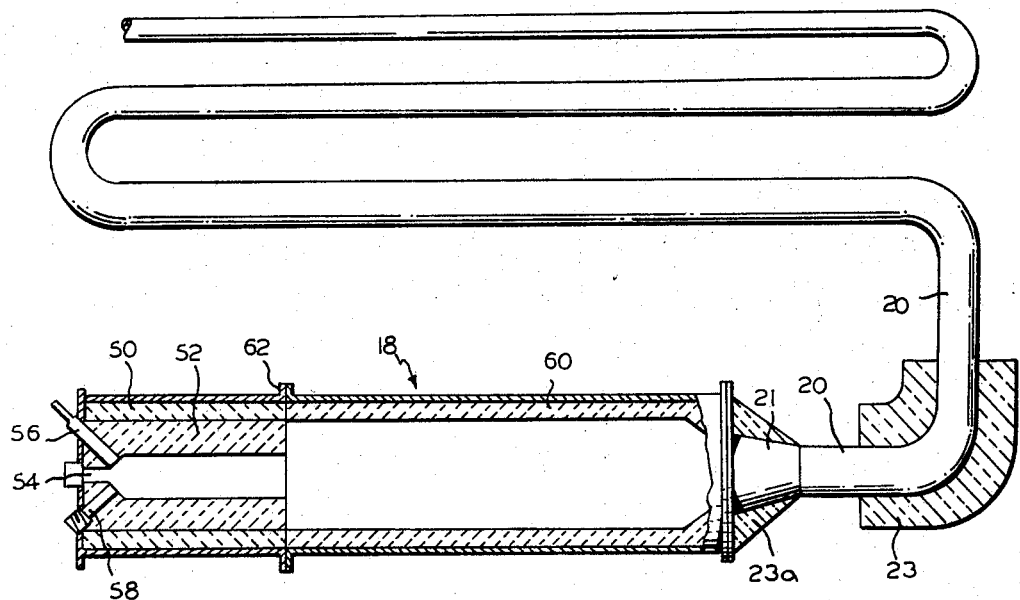

These and other objects and advantages will be more apparent after reading the following description in conjunction with the drawing, wherein:

FIG. 1 is a diagrammatic sketch illustrating the overall apparatus and process of the invention; and FIG. 2 is a sectional view of the combustion chamber used with this invention and the radiant cooling unit.

Considered from one aspect, the present invention involves an apparatus for producing an inert gas consisting almost solely of $CO_2$ and $N_2$ by the combustion of air and natural gas, such apparatus including:

(a) a mixing zone for forming admixtures of air and natural gas,
(b) inlets to said mixing zone for the introduction of air and natural gas,
(c) an elongated combustion chamber,
(d) a conduit connecting the outlet of said mixing zone with the inlet of said combustion chamber,
(e) the outlet of said combustion chamber being connected to a radiant cooling zone,
(f) said radiant cooling zone comprising an elongated conduit that makes a 90° turn a short distance away from the outlet end of said combustion chamber,
(g) the area adjacent to and surrounding said 90° turn being covered with a substantial amount of insulating material,
(h) a compressor and means for connecting the outlet of said radiant cooling zone with the inlet of said compressor,
(i) at least one cooling zone and means for connecting the outlet of said compressor with the inlet of said cooling zone, and
(j) a receiver storage tank connected to the outlet of said cooling zone for receiving and storing compressed gases.

Referring now to FIG. 1 for a more detailed understanding of the invention, a stream of natural gas or other organic fluids consisting principally of methane is conducted from a source not shown through a pipe 10. This natural gas may also contain small amounts of hydrocarbons having from 2–4 carbon atoms per molecule. Air is introduced through conduit 12 under pressure (e.g., by a blower) and the air and natural gas are admixed in a mixer 14 which preferably simply consists of a venturi mixer but which could be a more elaborate type of mixer. Any well known control means (not shown) may be used to maintain the pressure of the air and the pressure of the natural gas in a constant proportion to each other so that complete combustion will be assured. Furthermore, known backloading means may be employed to regulate the flow of the gas admixture in accordance with the variations in the pressure of a gas at another point in the apparatus—for instance, in accordance with the pressure at the inlet or outlet of the gas compressor.

From the mixer 14 the admixed gases are then conducted through conduit 16 into combustion chamber 18. A more detailed view of the combustion chamber is shown in FIG. 2. As shown, the essentially empty combustion chamber is surrounded by a relatively thin refractory shell which provides ample room for proper mixing and burning of the reactants while at the same time permitting considerable heat loss through the walls. The combustion chamber is preferably composed of two sections (an inlet section and an outlet section) encased in steel. The inlet section can be constructed from a cylindrical refractory section 50 consisting of 2000° F. or higher refractory material and an inner refractory burner section 52 which is able to withstand temperatures of 3000° or higher. The admixture of air and fuel gas is introduced through inlet 54 (from conduit 16). An opening 56 is also preferably provided for an ignition pilot tip (e.g., an intermittent gas-electric pilot). An opening 58 can also be provided for viewing the flame in the burner.

In the preferred embodiment shown, the combustion chamber contains no catalyst and no inert refractory material such as pebbles.

The outlet section of the combustion chamber preferably comprises a cylindrical section of high quality castable refractory material 60 which is joined to the front section at flanged junction 62. The refractory material 60 is preferably able to withstand temperatures of 3000° F. or greater, is light in weight and is considerably longer than the inlet section (e.g., about 3 times longer). The outlet end of the outlet section may be joined to conduit 20 by a refractory line Inconel cone 21.

The combustion chamber is air-cooled, thus avoiding any problems which might be associated by cooling jackets and cooling water.

The temperature in the combustion chamber is preferably maintained below about 2600° F. because above this temperature the undesirable formation of oxides of nitrogen occurs. I am able to maintain the temperature below 2600° F. by constructing the combustion chamber in the form of a long essentially unobstructed tube and removing a considerable amount of heat through the walls before the combustion reactions are completed.

The hot combustion gases leave the combustion chamber at a temperature of between about 2700° F. and 1600° F. and are passed into a radiant cooling section 20 consisting of several elongated high temperature alloy radiant tubes that by radiation and convection alone reduce the temperature of the hot combustion gases to within the range of about 1000° F. to 100° F. The tube arrangement in the radiant cooling section preferably progressively decreases in diameter from the inlet end to the outlet ends. The use of radiant tubes has the advantage that a supply of cooling water is unnecessary and therefore in hard water areas the elimination of the use of water avoids the occurrence of scale, corrosion and similar problems.

As is best shown in FIG. 2, the first corner of the radiant cooling section 20 is provided with insulation 23 for a relatively short distance starting at a point which is not too far away and at a predetermined distance from the outlet end of the combustion chamber. It has been found that this limited amount of insulation is an important factor contributing toward the successful operation of the present process in order to produce inert gases which consist nearly entirely of $CO_2$ and $N_2$ and very minute quantities of $O_2$, $CO$ and $H_2$. The exact reason why the partial insulation of radiant cooling section 20 at the first turn is so important is not known with certainty. It is believed that one possible explanation is that the insulation in effect increases the residence time and mixing of the combustion gases at a zone of elevated temperature so that the combustion gases have an added amount of time to come to an equilibrium which favors the formation of $CO_2$ and minimizes the formation of $O_2$, $CO$ or $H_2$.

The first turn of the radiant cooling zone is shown as a 90° turn. However, it may be possible to utilize any other means for, for example, mixing the reacted gases by a baffle or valve or other means of creating turbulence of the reacted gas.

When complete air cooling is not required, the combustion gases next enter the pre-cooler 22 where, by means of water indirectly introduced through pipe 24 the temperature of the gases is reduced to 20° above the inlet water temperature so that they can thereafter be readily compressed without overheating the compressor. The pre-cooler is optional and can be omitted if desired.

After leaving the pre-cooler, the cooled gases and any condensed water enter the receiver surge tank 26. The condensed water is removed from this tank automatically via a condensate drain without the loss of gas. Automatic interlocks prevent this tank from being evacuated by the compressor. This tank is sized and arranged so as to dampen any pulsations which may be caused by a reciprocating compressor and prevent their reaction from upsetting the precise fuel-air ratio metering adjustments. The cooled gases in tank 26 may be under a slight positive pressure and at the outlet from the tank are at the design volume flow rate. Tank 26 preferably contains internal entrainment separator baffles.

Following the surge tank 26 the gas passes through conduit 28 and into compressor 30. In the compressor the pressure is raised to about 100 pounds per square inch and during such compression the temperature rises to about 350° F. A return line 31 is installed from the outlet of the compressor 30 to the inlet of the compressor. By controlling the flow of the compressed gas through this return line, it is possible to eliminate a throttle valve from the mixing system and the flow of gases is automatically controlled. This means then that synchronization between the gas-air mixture and the gas required for the compressor is not required.

The compressed gases are introduced through conduit 32 into an after-cooler 34 where the gases are cooled by indirect contact with cooling water and preferably the same cooling water which was used in pre-cooler 22. The gases are then removed through conduit 36 and introduced into a moisture trap 38 and the moisture removed through conduit 40. The compressed and dried gas is then taken through line 42 to a refrigerator unit 44 where the temperature is lowered to about 35° and further amounts of water removed. The gas, which is now under a pressure of about 90 pounds per square inch is removed through conduit 46 and introduced into receiver storage tank 48. The supply of inert gas in tank 48 may be removed and used as desired.

The above system may be provided with appropriate valves, gauges and switches so that when the pressure in tank 48 exceeds a predetermined value (e.g., 100 p.s.i.) the feed to the combustion chamber will be stopped. Similarly, the system may be provided with any desired number of back pressure valves. Also, the compressor can be caused to vent or unload when the pressure in tank 48 exceeds a predetermined value (e.g. 125 p.s.i.).

The apparatus and process of this invention are capable of delivering an inert gas having the following typical composition (on a dry basis):

| | | |
|---|---|---|
| $CO_2$ | minimum | 11.5% |
| $O_2$ | maximum | 0% |
| $CO$ | do | .5% |
| $H_2$ | do | .5% |
| $N_2$ | | Balance |

These results were obtained using 12.3% ultimate $CO_2$ Los Angeles natural gas. The dew point of the inert gas will be 0° F. at atmospheric pressure when the compressor and refrigeration-dryer units are used as part of the complete system.

The present apparatus and process represent an important step forward in the art of inert gas production. Heretofore, commercial inert gas generators having no catalyst have only been able to produce compositions containing between 9 and 10.5% $CO_2$. With the present invention $CO_2$ yields of 11.5–12% $CO_2$ are obtained, which amounts to a 9–33% improvement in the $CO_2$ yield. The yield of oxygen is less than 5 p.p.m., which is highly desirable. Furthermore, the present invention produces only very minute amounts of $CO$, which is a cumulative toxic that can be fatal.

While this invention has been described with particular reference to natural gas as a fuel, no invention would be involved in substituting coke-oven gas, propane, butane and the like, even if slight modifications would be required. In conclusion, while there has been illustrated and described a preferred embodiment of my invention, it is to be understood that since various details of construction may obviously be varied considerably without really departing from the basic principles and teachings of the invention, I do not limit myself to the precise constructions herein set forth and the right is specifically reserved to encompass all changes and modifications coming within the scope of the invention as defined in the appended claims.

It should be understood that the apparatus and method disclosed herein may be used with any combination of fluids which will react with an exothermic heat release to produce gases other than inert.

I claim:

An apparatus for producing an inert gas consisting almost entirely of $CO_2$ and $N_2$ by the combination of air and natural gas, such apparatus comprising in combination:

(a) a mixing means for forming admixtures of air and natural gas in amounts required for substantially complete combustion, (b) said mixing means having inlets for the introduction of air and natural gas and an outlet, (c) an elongated refractory lined combustion chamber having an inlet and an outlet, (d) a conduit connecting the outlet of said mixing means with the inlet of said combustion chamber, (e) the outlet of said combustion chamber being connected to an elongated radiant cooling means, (f) said elongated radiant cooling means comprising in sequence from the upstream end to the downstream end a first section that is uninsulated, a second section further downstream that is insulated and a third section still further downstream that is uninsulated, said second insulated section being spaced only a short distance from the outlet of the combustion zone and comprising means to increase the residence time and mixing of the combustion gases at a zone of elevated temperature so that the combustion gases will have an added amount of time to come to an equilibrium that favors the formation of $CO_2$ and minimizes the formation of $O_2$, CO and $H_2$, (g) a compressor and means for connecting the outlet of said radiant cooling zone means with the inlet of said compressor, (h) at least one cooling means and means for connecting the outlet of said compressor with the inlet of said one cooling means, and (i) a receiver storage tank connected to the outlet of said one cooling means for receiving and storing compressed gases.

References Cited

UNITED STATES PATENTS

| | | | |
|---|---|---|---|
| 2,506,120 | 5/1950 | Turner | 126—90 |
| 2,772,952 | 12/1956 | Jacobs | 23—281 |
| 3,177,150 | 4/1965 | Cameron | 23—281 X |

JAMES H. TAYMAN, Jr., *Primary Examiner.*

MORRIS O. WOLK, *Assistant Examiner.*